United States Patent [19]

Becker

[11] 4,106,634

[45] Aug. 15, 1978

[54] CRAWLER-TYPE SELF-PROPELLED HOIST

[76] Inventor: Clifford E. Becker, 1196-B Filbert Ave., Chico, Calif. 95926

[21] Appl. No.: 803,238

[22] Filed: Jun. 3, 1977

[51] Int. Cl.$^2$ .................... B25J 3/00

[52] U.S. Cl. .................... 214/1 D; 180/9.26; 214/1 H; 214/85.1; 254/2 R

[58] Field of Search .................... 214/1 R, 1 M, 1 S, 1 D, 214/1 H, 92, 85.1, 750, 700; 180/9.2 R, 9.34, 9.26, 9.2 C; 254/2 R, 2 C

[56] References Cited

U.S. PATENT DOCUMENTS

| | | | |
|---|---|---|---|
| 2,931,519 | 4/1960 | Beach | 214/1 D |
| 3,666,127 | 5/1972 | Guyaux | 214/512 |
| 3,796,334 | 3/1974 | Torrey | 214/1 H X |
| 3,817,401 | 6/1974 | Becker | 214/1 D |

FOREIGN PATENT DOCUMENTS

| | | | |
|---|---|---|---|
| 604,503 | 9/1960 | Canada | 214/1 D |
| 534,468 | 10/1955 | Italy | 180/9.34 |

*Primary Examiner*—Frank E. Werner
*Attorney, Agent, or Firm*—Roger B. Webster

[57] ABSTRACT

A self-propelled steerable hoist for use in the placement of mobile homes on support blocks at a predetermined site; the hoist, in the general nature of a low bed vehicle, being a modification of, and for the same purpose as, the hoist disclosed in my U.S. Pat. No. 3,817,401, dated June 18, 1974, on SELF-PROPELLED DUAL-JACK HOIST.

In the present embodiment, the hoist includes a low-level but spaced-aboveground, elongated hoist beam centrally disposed between, and supported by, a pair of elongated but low-profile, selectively driven, ground-engaging, endless track units; there being power-actuated, hoist beam supporting and lifting mechanism between said track units and the hoist beam operative to elevate the latter from an initial lowered position lying between the track units to a raised position thereabove and in which said hoist beam engages and lifts a mobile home from beneath and for shifting about as necessary for proper placement on the support blocks.

A platform—fixed on and projecting rearwardly from the elongated hoist beam—provides the mounting base for operator-attended power and control devices of the hoist.

6 Claims, 12 Drawing Figures

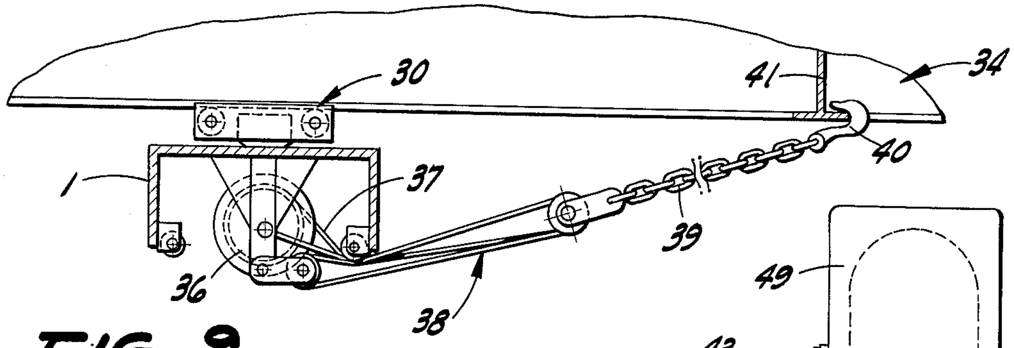
FIG-9
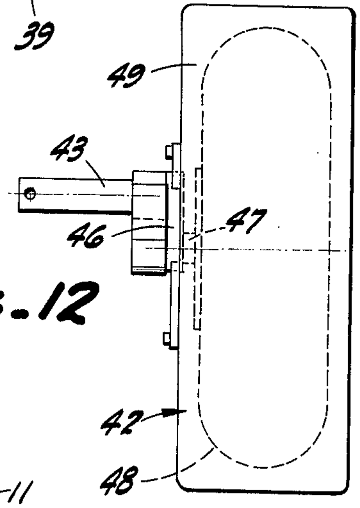
FIG-12
FIG-10
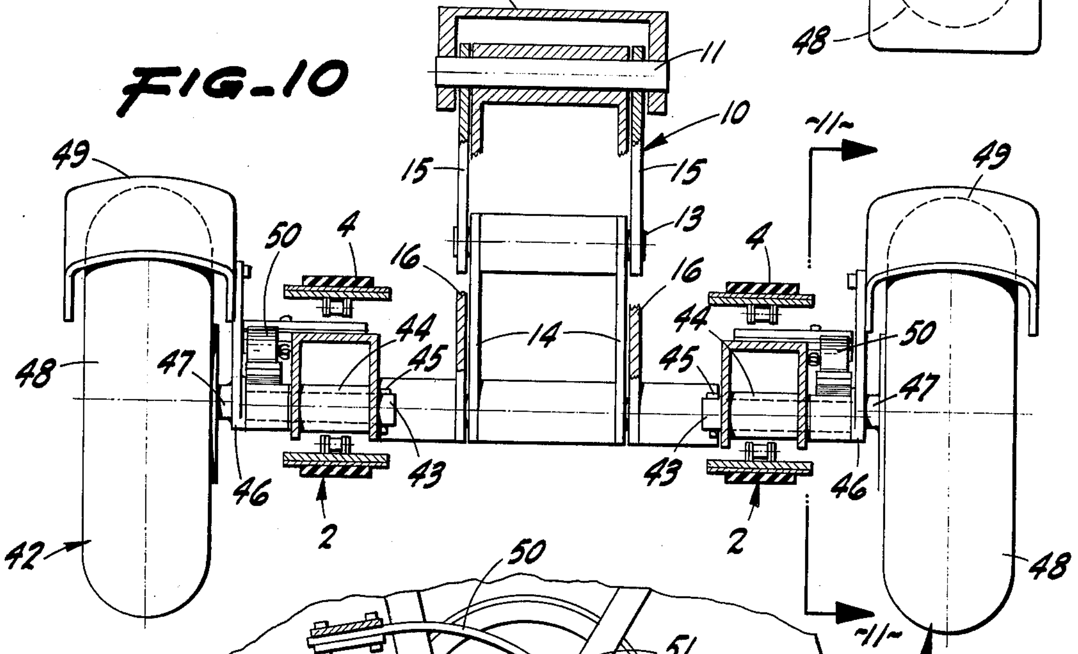
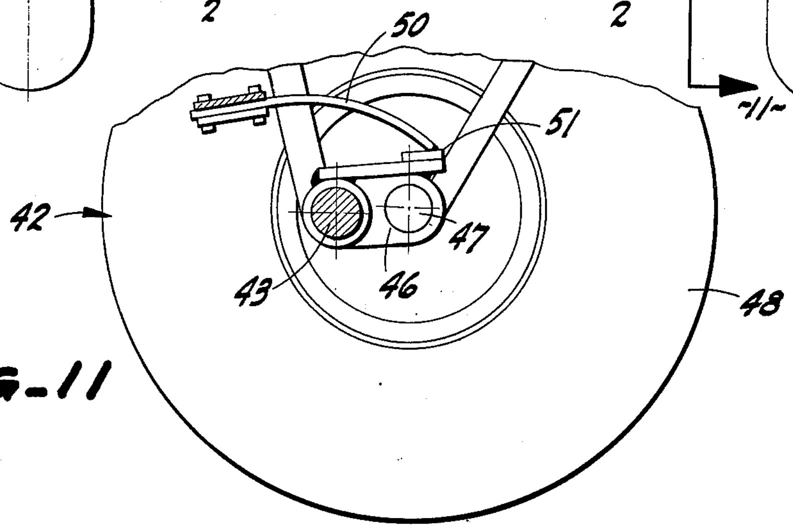
FIG-11

CRAWLER-TYPE SELF-PROPELLED HOIST

BACKGROUND OF THE INVENTION

1. Field of the Invention

While the self-propelled dual-jack hoist of my U.S. Pat. No. 3,817,401 was quite successful in use, it appeared—with continued development—that faster performance, improved maneuverability, and increased stability, together with certain additional functions, were desirable in a hoist of the type, and for the purpose, described. The present modification of the hoist was conceived by me in a successful effort to provide such improvements.

2. The Prior Art

My identified U.S. Pat. No. 3,817,401 is the most relevant prior art known to me, while other known prior art—beyond the references cited in the file of such patent—is represented by the following U.S. patents:

U.S. Pat. No. 2,471,901
U.S. Pat. No. 2,480,916
U.S. Pat. No. 2,533,980
U.S. Pat. No. 3,761,040.

The above prior art—considered singly or together—does not anticipate, nor suggest as obvious, the particular structure of the herein-claimed crawler-type self-propelled hoist, and applicant has no knowledge of any prior art disclosing such particular structure.

SUMMARY OF THE INVENTION

The present invention provides, as a major object, a self-propelled steerable hoist—in the nature of a low-bed vehicle for use in the placement of mobile homes on support blocks—which includes a low-level but spaced-aboveground, elongated hoist beam centrally disposed between, and supported by, a pair of elongated but low-profile, selectively driven, ground-engaging, endless track units; there being power-actuated, hoist beam supporting and lifting mechanism between said track units and the hoist beam operative to elevate the latter from an initial lowered position lying between the track units to a raised position thereabove and in which said hoist beam engages and lifts a mobile home from beneath and for shifting about as necessary for proper placement on the support blocks.

The present invention provides, as another important object, a self-propelled steerable hoist, as in the preceding paragraph, which includes a platform fixed relative to, and projecting rearwardly from, the elongated hoist beam; such platform providing the mounting base for operator-attended power and control devices of the hoist.

The present invention provides, as other important objects, a self-propelled steerable hoist, for the purpose described, which has faster performance and improved maneuverability, as well as enhanced footing and traction characteristics; can, in motive mode, simultaneously support and move a mobile home; can attain relatively higher and lower hoist positions than previously; and can readily accommodate mobile homes of varying frame width.

The present invention provides, as still another object, a crawler-type self-propelled hoist, for the purpose described, which includes—in accessory relation—a set of readily attachable transport wheels whereby the hoist, with the wheels attached and the hoist in an above-road position, can be coupled to and towed from place to place by a conventional motor vehicle.

The present invention provides, as a further object, a crawler-type self-propelled hoist which is simple in structure and designed for ease and economy of manufacture.

The present invention provides, as a still further object, a practical, reliable, and durable crawler-type self-propelled hoist, and one which is exceedingly effective for the purpose for which it is designed.

BRIEF DESCRIPTION OF THE DRAWINGS

FIG. 9 is a fragmentary cross section taken substantially on line 9—9 of FIG. 3; the view showing the winch unit as mounted on the underside of the hoist beam.

FIG. 10 is a cross section taken substantially on line 10—10 of FIG. 7; the view showing the mounting of the transport wheel units.

FIG. 11 is a fragmentary sectional elevation taken substantially on line 11—11 of FIG. 10; the view showing the mounting of one of the transport wheel units.

FIG. 12 is a top plan view of one of the transport wheel units, detached.

DESCRIPTION OF THE PREFERRED EMBODIMENT

Figure 2:
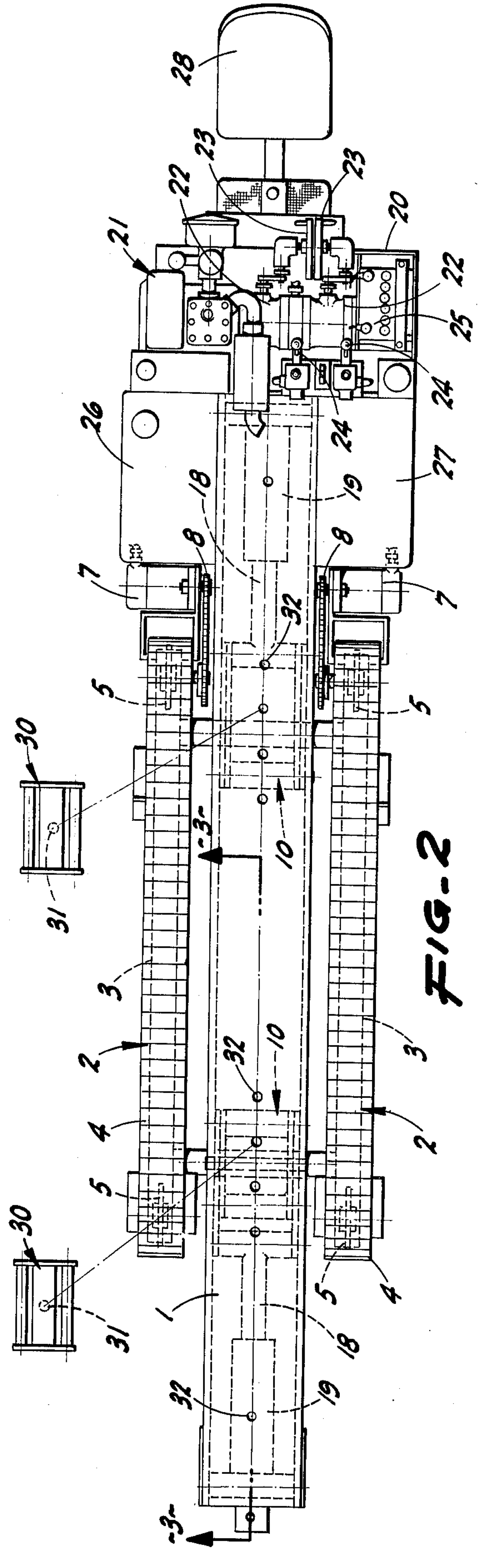
FIG. 2 is a plan view of the hoist with the roller-type, load-supporting pads shown detached from the hoist beam.

Referring now more particularly to the drawings and to the characters of reference marked thereon, the self-propelled steerable hoist of the present invention comprises a low-level but spaced-aboveground, elongated hoist beam 1 of inverted channel shape in cross section; such hoist beam being centrally disposed between a pair of elongated but low-profile, laterally spaced, ground-engaging, endless track units, each indicated generally at 2. The endless track units 2 each include a longitudinal frame 3 which carries an endless track 4 trained about end sprockets 5; each endless track 4 (which includes rubber traction cleats 6) being spring-tensioned in a substantially conventional manner.

The endless track units 2 are individually driven from the rear end by a reversible hydraulic motor 7 mounted in connection with the related track frame 3 and driving the corresponding track 4 by means of an endless chain and sprocket array 8.

The endless track units 2 are interconnected in unitary parallel relation, but for independent and selective operation, by means of low-level, front and rear cross shafts, each indicated at 9; such cross shafts being end-secured in the frames 3 of said endless track units 2.

The elongated hoist beam 1, as centrally disposed between the endless track units 2, is mounted—in connection with the latter in supported and vertically adjustable relation—by means of front and rear foldable pantograph-type linkage assemblies 10 pivotally connected between the related cross shafts 9 and corresponding pivot points thereabove on the hoist beam 1. Each linkage assembly 10 is double-sided for strength and stability, and includes an upper pivot 11 on the hoist beam 1 and intermediate or elbow pivots 12 and 13. It will be appreciated that—upon folding of the linkage assemblies 10—the hoist beam will be disposed in a lowered position lying substantially between the endless track units 2 (see FIG. 5), while such linkage assemblies 10—when unfolded—elevate the hoist beam 1 to a raised position substantially above said endless track units 2 (see FIG. 4).

Each linkage assembly 10 embodies, on each side, upwardly divergent lower arms 14 and downwardly divergent upper arms 15; the longitudinally outermost lower arms 14 of each linkage assembly 10 being extended upwardly beyond the pivots 12 to form lever arms 16 which are disposed at an upward and longitudinally outward incline relative to the corresponding linkage assembly. At their upper ends, and which lie within the channel of the hoist beam 1, such lever arms 16 are pivotally connected, as at 17, to the free end of the piston rod 18 of a longitudinally inwardly extending, heavy-duty, fluid pressure actuated, double-acting power cylinder 19 pivotally mounted mainly within the end portions of the channel of the hoist beam 1.

Figures 3, 4, 5:
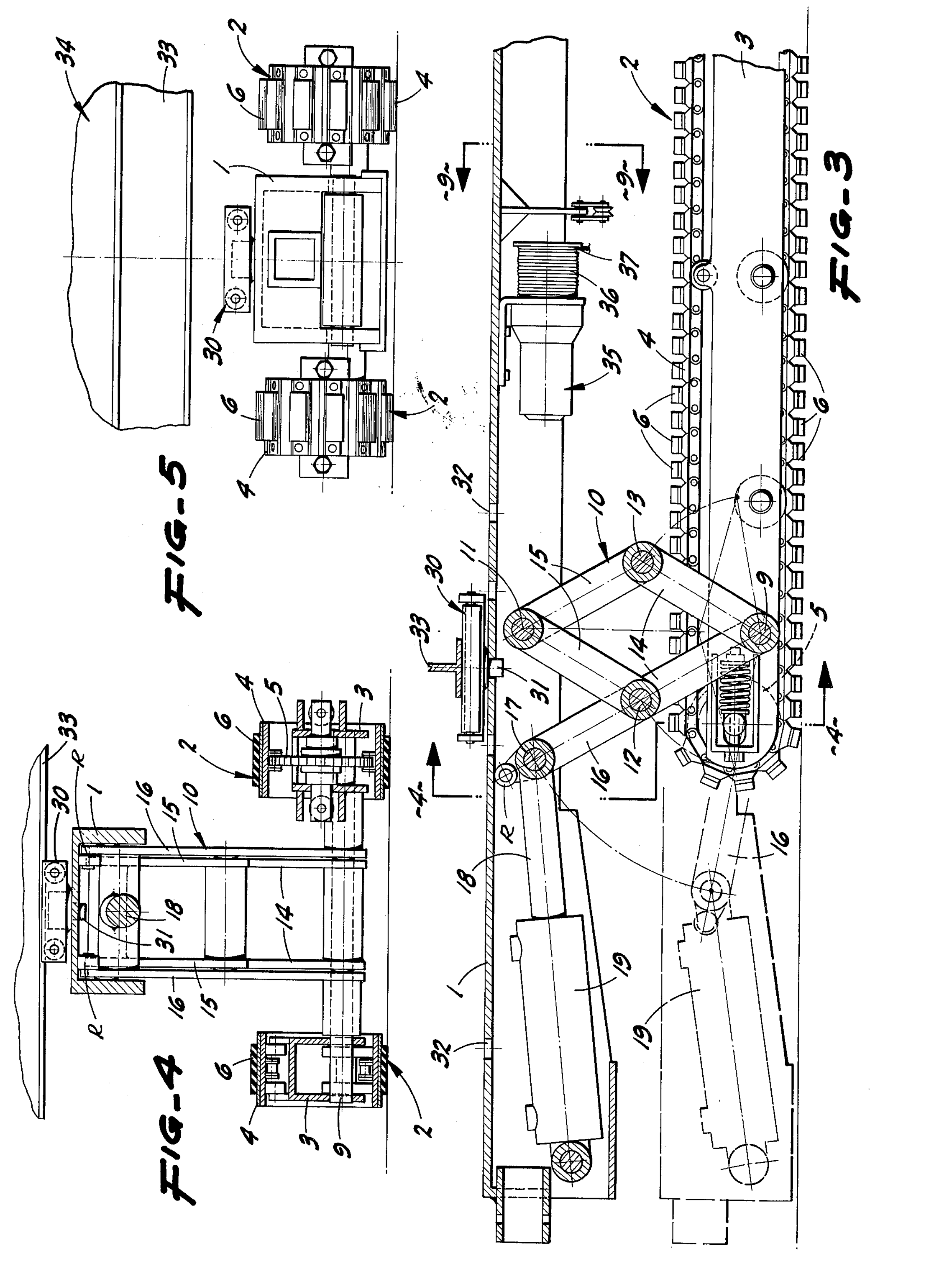
FIG. 3 is a fragmentary, enlarged sectional elevation taken substantially on line 3—3 of FIG. 2; the hoist beam being shown in raised position in full lines, and in lowered position in broken lines.
FIG. 4 is a cross section taken substantially on line 4—4 of FIG. 3, with the hoist beam shown in raised position.
FIG. 5 is a cross section taken substantially on line 5—5 of FIG. 3, with the hoist beam shown in lowered position.

When the power cylinders 19 are contracted, the linkage assemblies 10 are in folded, lowered position, and when the power cylinders are extended, the linkage assemblies are unfolded to raised position, as shown respectively in FIGS. 5 and 4. The double-acting power cylinders are arranged for actuation simultaneously or individually, selectively, as will later appear.

It is preferred, and as shown in FIGS. 3 and 4, that the lever arms 16 be provided—at their upper ends, and above the related pivots 17—with transverse axis rollers R which bear against the underside of hoist beam 1 when the linkage assemblies 10 are unfolded and in a raised working position; such rollers R providing additional lifting thrust on, and support for, the hoist beam when the hoist is in use in the manner hereinafter described.

At the rear end thereof, the hoist beam 1 is fitted with a fixed, rearwardly projecting platform 20 which provides the mounting base for operator-attended power and control devices of the hoist. Such power and control devices include an engine 21, a multiple hydraulic pump assembly 22, a pair of valve-actuating levers 23 of side-by-side rotary type, a separate pair of upstanding, valve-actuating levers 24, and a battery 25. Additionally, there is provided—in association with the platform 20—tanks 26 and 27 containing the hydraulic fluid.

The pair of separate, rotary-type, side-by-side valve-actuating levers 23 (which correspond to the endless track units 2) selectively control reversible operation of the hydraulic motors 7 which drive said track units, while the pair of other separate and upstanding valve-actuating levers 24 selectively control reversible operation of the power cylinders 19 which unfold and fold the linkage assemblies 10. As the hydraulic systems—in which the pairs of valve-actuating levers 23 and 24 are included—are essentially of conventional form, such systems (including the flexible connecting hoses) are not shown in full, and are either omitted or shown in part and otherwise broken away.

A seat 28, for the operator, is supported immediately to the rear of the assembly of the power and control devices of the hoist; such seat being carried, detachably, in connection with the platform 20 by a suitable mount 29.

A pair of spaced, load-supporting pads 30, of roller type, are carried on the hoist beam 1 for adjustment therealong; each pad having a depending center pin 31 adapted for engagement in a selected one of a row of holes 32 in such hoist beam. The pads 30, prepratory to use of the hoist, are first adjusted to a spacing on the hoist beam 1 corresponding to the spacing of the lengthwise under-frames 33 of the mobile home (shown in part in outline at 34) to be handled by the hoist.

In use of the above-described, crawler-type, self-propelled hoist to engage, lift, and shift a mobile home 34 for placement on support blocks, the hoist beam 1 is initially in lowered position, and then the hoist is propelled by the endless tracks 4 to a position extending transversely of the mobile home—preferably at an end portion thereof. The endless tracks 4 are, of course, controlled for simultaneous operation for straight-away travel, or for differential operation for steering to right or left while travelling, by means of the rotary-type valve actuating levers 23, and which—because of their side-by-side positioning—can be single-hand-engaged and manipulated—especially for simultaneous operation of the endless tracks.

Upon the hoist being run laterally under the mobile home to proper position, the pantograph linkage assemblies 10 are unfolded by operation of the power cylinders 19 under the control of the valve-actuating levers 24. Upon such linkage assemblies being thus power-unfolded, the hoist beam is lifted from its initial and lowered position between the endless track units 2 to a raised position thereabove (FIG. 1); the pads 30 then engaging the under-frames 33 of the mobile home, and the latter being lifted (to the extent desired) by continued upward movement of said hoist beam. Nextly, the hoist is moved forward and rearward, with steering if necessary, to shift the mobile home to the exact desired location, and thereafter the linkage assemblies 10 are folded; this lowering the hoist beam 1 until the mobile home comes to rest on the support blocks. An advantage resides in the fact that the entire hoist is not only stable but also motive on the terrain whereby there is no limit to the extent of mobile home movement and as was the case in the prior embodiment.

The hoist is normally employed at one end portion of the mobile home and then at the other, yet—because of its ready maneuverability—the hoist can be used at any point which conditions may require.

Figure 6:
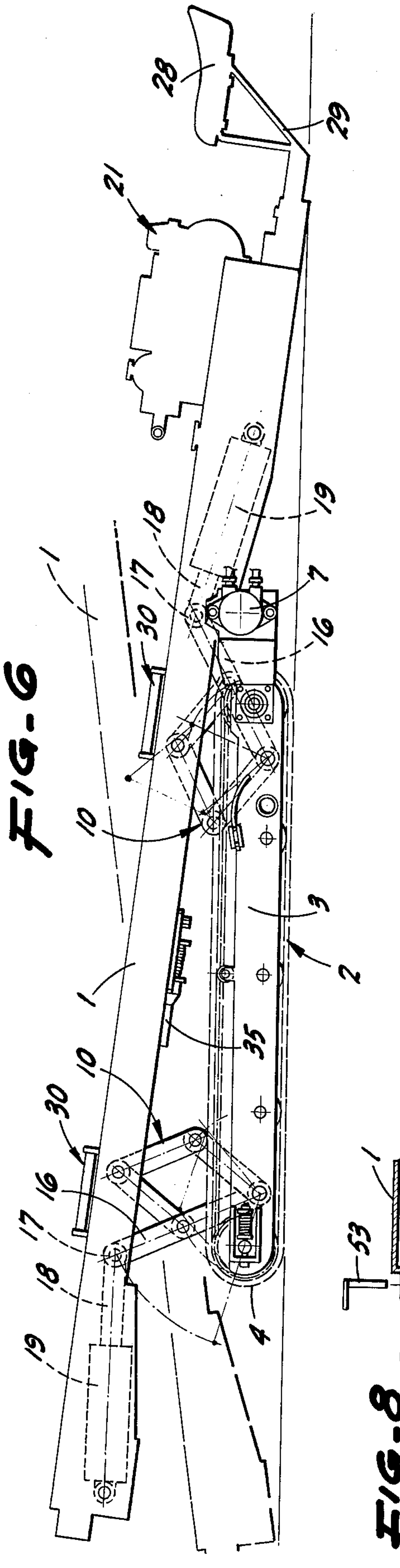
FIG. 6 is a side elevation similar to FIG. 1, but shows the hoist beam as tilted, selectively, to a forward and upward incline, or to a rearward and upward incline.

Also, if the terrain beneath the mobile home is inclined, the linkage assemblies 10 can be differentially unfolded —by the selectively and independently controlled power cylinders 19—so that the hoist beam 1 remains relatively horizontal while the endless track units 2 rest on such inclined terrain. See FIG. 6 wherein, for the purpose of illustration, the hoist beam 1 is shown in full lines as relatively inclined forwardly and upwardly, and in broken or phantom lines as relatively inclined rearwardly and upwardly.

Figure 1:
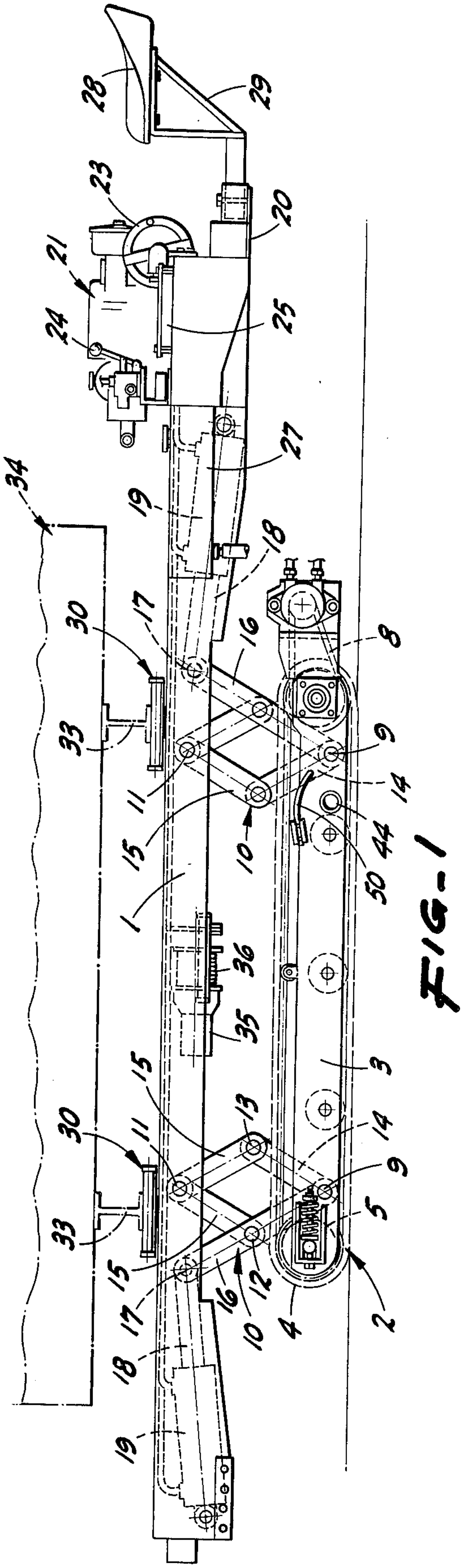
FIG. 1 is a side elevation of the hoist with the hoist beam in raised, load-supporting position.

When a mobile home is supported by the hoist beam 1 in a lifted position, it is sometimes desirable that it be shifted in its length on the pads 30 i.e., in a direction crosswise of the hoist. This is accomplished as follows:

As shown particularly in FIGS. 1, 3, and 9, an electric winch, indicated generally at 35, is mounted within the hoist beam 1 at an intermediate point in the length thereof; such winch (which has a longitudinal axis) including an electric motor-driven winch drum 36 on which a cable 37 is wound. The cable 37 pays from the winch drum 36 laterally of the hoist, and is reeved back and forth in a block and tackle unit 38; the latter—at its outer end—including a chain 39 having a free-end hook 40. When it is desired to shift the mobile home lengthwise, and which is crosswise of the hoist, the block and tackle unit 38 is extended, and the hook 40 is engaged with a cross frame 41 of the mobile home. Thereafter, upon actuation of the winch drum 36, the block and tackle unit 38 shortens, and the mobile home is power-shifted lengthwise by reason of the force applied through the hook 40 to the cross frame 41. The electric winch 35 is, of course, energized from the battery 25 and through the medium of a circuit including a manual switch (not shown).

When it is desired to transport the described crawler-type, self-propelled hoist from one place of use to another; and on a road, accessory wheel units (each indicated generally at 42) are attached to opposite sides of the hoist; such wheel units each being constructed and mounted as follows (see FIGS. 7, 10, 11, and 12):

A spindle 43 projects through a transverse sleeve 44 in the frame 3 of the related endless track unit 2; the spindle being removable retained in said sleeve by a cross pin 45 which extends through the inner end of said spindle. At its outer end, the spindle 43 is fitted with a crank arm 46 which extends rearwardly from said spindle 43. At its rear end, the crank arm 43 is fitted with an outwardly projecting stub axle 47 on which the related wheel 48 is rotatably mounted. Each accessory wheel unit includes a fender 49 which overhangs the related wheel 48.

In order to provide a spring action to each wheel 48, an arcuate leaf spring 50 is fixed at one end in connection with the adjacent frame 3, and thence extends rearwardly and bears in spring relation on a wear member 51 on the crank arm 46.

Figure 8:
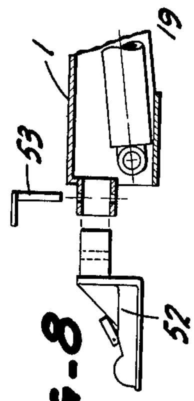
FIG. 8 is a fragmentary side view illustrating, in part, the coupling employed to connect the hoist to a motor vehicle for towing.

Preparatory to mounting the wheel units 42 on the hoist, as above, the front end of the hoist beam 1—which projects ahead of the endless track units 2—is first connected by a coupling 52 to the rear end of a towing vehicle (not shown). The coupling 52 is of a type which may be detached, and which detachment is accomplished by withdrawal of a pull pin 53 (see FIG. 8). After the front end of the hoist beam 1 is coupled to the towing vehicle, said hoist beam (which is in a raised position) is temporarily blocked up or stand-supported from the ground, whereupon the linkage assemblies 10 are actuated in a manner to raise the endless track units 2 to a position sufficiently aboveground for convenient insertion of the spindles 43 in the sleeves 44. The wheels 48 then depend below the track units 2.

Figure 7:
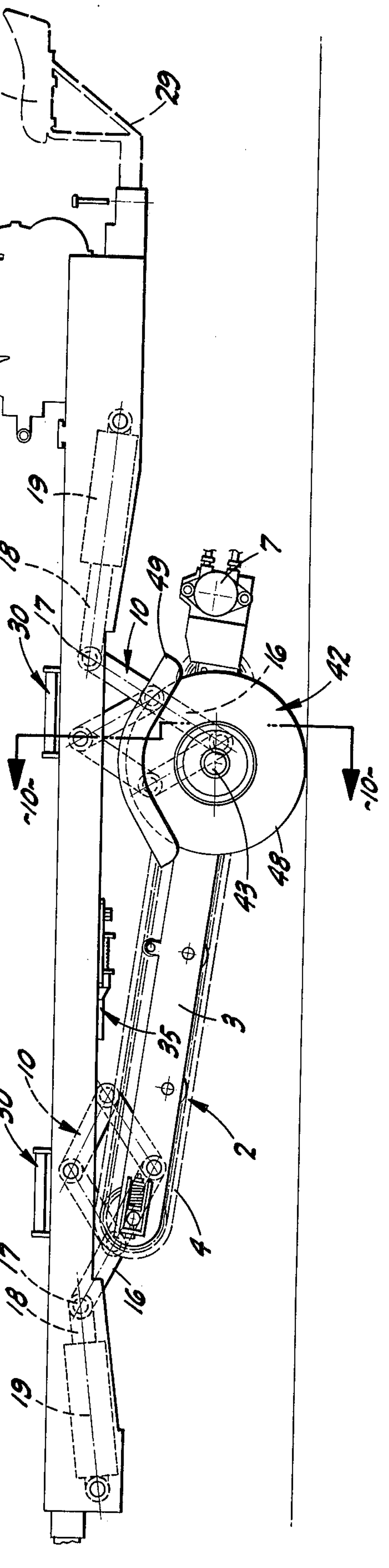
FIG. 7 is a side elevation of the hoist with the transport wheel units attached and as supported thereby for road travel in trailing relation to a motor vehicle.

When the wheel units 42 are mounted on the hoist in the manner described, it is preferred that (for towing of the hoist on a road) the then-aboveground endless track units 2 be disposed—by adjustment of the linkage assemblies 10—at a forward and upward incline as shown in FIG. 7.

From the foregoing description, it will be readily seen that there has been produced such a crawler-type self-propelled hoist as substantially fulfills the objects of the invention as set forth herein.

While this specification sets forth in detail the present and preferred construction of the crawler-type self-propelled hoist, still in practice such deviations from such detail may be restored to as do not form a departure from the spirit of the invention as defined by the appended claims.

I claim:

1. A hoist comprising a pair of elongated, power-driven, lowprofile, endless track units disposed in adjacent but spaced parallel relation, said endless track units being interconnected in unitary relation, an elongated hoist beam disposed between the endless track units, and power-actuated supporting and lifting mechanism connected between the endless track units and the hoist beam supporting the latter in an initial lowered position between the endless track units and operative to elevate said hoist beam from said initial lowered position to a raised position above the track units; there being longitudinally spaced cross shafts interconnecting the endless track units, and said power-actuated supporting and lifting mechanism comprising pantograph-type linkage assemblies corresponding to and disposed above said cross shafts, each such linkage assembly being pivoted at its lower end on the related cross shaft, and pivoted at its upper end on the hoist beam.

2. A hoist, as in claim 1, including a power cylinder mounted on the hoist beam corresponding to and connected in actuating relation to each of the linkage assemblies.

3. A hoist, as in claim 2, in which each linkage assembly includes an extended lever arm, and the related power cylinder being connected to such extended lever arm.

4. A hoist, as in claim 3, in which each linkage assembly includes, on the upper end of said extended lever arm, a transverse axis roller adapted to engage the underside of the hoist beam upon unfolding of the related pantograph-type linkage assembly.

5. A hoist comprising a pair of elongated, power-driven, low-profile, endless track units disposed in adjacent but spaced parallel relation, said endless track units being interconnected in unitary relation, an elongated hoist beam disposed between the endless track units, and power-actuated supporting and lifting mechanism connected between the endless track units and the hoist beam supporting the latter in an initial lowered position between the endless track units and operative to elevate said hoist beam from said initial lowered position to a raised position above the track units; there being an electric winch mounted on the underside of the hoist beam intermediate its ends, and such winch including a winch drum, the axis of the winch drum extending lengthwise of the hoist beam, and a cable wound on the winch drum and adapted to pay therefrom laterally of the hoist beam.

6. A hoist comprising a pair of elongated, power-driven, low-profile, endless track units disposed in adjacent but spaced parallel relation, said endless track units being interconnected in unitary relation, an elongated hoist beam disposed lengthwise between the endless track units, power-actuated supporting and lifting mechanism connected between the endless track units and the hoist beam, said power-actuated supporting and lifting mechanism including longitudinally spaced, foldable linkage assemblies of pantograph type and which when folded support the hoist beam in an initial lowered position substantially between the endless track units, the linkage assemblies when unfolded elevating said hoist beam from said initial lowered position to a raised position above the track units, and a corresponding longitudinal power cylinder mounted on the hoist beam and connected to each linkage assembly in unfolding and folding relation thereto.

* * * * *